United States Patent [19]

Akimoto et al.

[11] 4,357,751
[45] Nov. 9, 1982

[54] ELECTRICAL CONTACT MANUFACTURING METHOD AND APPARATUS

[75] Inventors: Mamoru Akimoto; Kazushi Konno; Toshimasa Hagyu, all of Kawasaki, Japan

[73] Assignee: Fuji Electric Co., Ltd., Kanagawa, Japan

[21] Appl. No.: 202,507

[22] Filed: Oct. 31, 1980

[30] Foreign Application Priority Data

Nov. 6, 1979 [JP] Japan ................................ 54-143534

[51] Int. Cl.³ ............................................ H01R 43/02
[52] U.S. Cl. ...................................... 29/879; 29/33 M
[58] Field of Search ................ 29/874, 876, 877, 878, 29/879, 882, 33 M, 729, 742, 747; 219/56, 56.1, 56.22

[56] References Cited

U.S. PATENT DOCUMENTS

| | | | |
|---|---|---|---|
| 3,258,830 | 7/1966 | Pityo | 29/879 |
| 3,514,574 | 5/1970 | Forschler | 219/56.1 X |
| 3,803,711 | 4/1974 | Dubuc et al. | 29/879 |
| 3,894,334 | 7/1975 | Bannister et al. | 29/879 |
| 3,943,625 | 3/1976 | Brenan et al. | 29/879 |

Primary Examiner—Ervin M. Combs
Attorney, Agent, or Firm—Sughrue, Mion, Zinn, Macpeak & Seas

[57] ABSTRACT

An electrical contact manufacturing method and apparatus with which entrance of the contact into a base metal plate is prevented during forming of the contact to thereby increase the service life of the contact. A contact material is welded in the form of a spot to a predetermined position on a base metal plate. The contact material is depressed from above by an upper punch to mold the electrical contact. Simultaneously, the portion of the base metal plate lying directly below the contact is depressed with a lower punch to raise that portion of the base metal plate and the contact.

7 Claims, 8 Drawing Figures

ELECTRICAL CONTACT MANUFACTURING METHOD AND APPARATUS

BACKGROUND OF THE INVENTION

The present invention relates to electrical contact manufacturing methods and apparatus. More specifically, the invention relates to an electrical contact manufacturing method in which an electrical contact in the form of a spot welded to a predetermined position on a base metal plate is raised together with the base metal plate to increase the service life of the contact.

Electrical contacts in electromagnetic switches are formed as spot-like contacts made of a noble metal such as silver. Such contacts are welded to predetermined points on base metal plates made of copper or brass. In order to weld a contact to the base metal plate, a staking method, a brazing method and a resistance welding method have previously been employed. In the resistance welding method, current is made to flow between the base metal plate and the contact material which are disposed between two electrodes and the base metal plate and the contact material are welded together under pressure. The resistance welding method is extensively employed. In welding a relatively small contact material to a base metal plate using the resistance welding method, the contact material which is, for instance, a silver wire, is held with one of the electrodes while the end of the contact material is welded to the surface of the base metal plate on the other electrode while being depressed against the plate. Thereafter, the contact material is cut to a desired length to provide a contact. The contact thus formed is shaped under pressure with a shaping punch.

In the conventional contact manufacturing method, the shaping punch placed on the contact welded to the base metal plate is strongly pressed towards the base metal plate as a result of which a portion of the contact cuts into the base metal plate. The volume of the portion is, in general, about 10 to 15% of the total volume of the contact.

When a switch having such contacts is repeatedly operated, the contacts are gradually worn beginning with the top surface and the circumferential surface such as shown by phantom lines 11, 12 and 13 as indicated in FIG. 8. When the contact is worn to the line 13, it is necessary to replace it with a new one. However, such replacement is not economical because the worn contact still has a volume of 20% of its initial volume including the aforementioned portion which is cut into the base metal plate. Thus, the replacement or disposal of the worn contact is a waste of the expensive contact material.

Accordingly, an object of the invention is to provide an electrical contact manufacturing method in which the entrance of the contact into the base metal plate is prevented during the resistance welding process thereby increasing the service life of the contact.

Another object of the invention is to provide an electrical contact manufacturing apparatus for practicing the method.

SUMMARY OF THE INVENTION

The foregoing objects and other objects of the invention have been achieved by the provision of an electrical contact manufacturing method which includes the steps of welding a contact material in the form of a spot to a predetermined position on a base metal plate, depressing the contact material from above with an upper punch to mold an electrical contact, and depressing a portion of the base metal plate with a lower punch directly below the contact to raise the portion and the contact.

An electrical contact manufacturing apparatus according to the invention includes an upper punch having a recess at the end thereof with the recess adapted to mold an electrical contact and a lower punch adapted to press a portion of a base metal plate directly below the electrical contact welded to the base metal so as to raise both of the portion of the base metal plate and the contact.

As described above, according to the invention, both the spot-like contact welded to the surface of the base metal plate and the portion of the base metal plate are raised. Therefore, the contact can be used until it wears to near the junction surface between the contact and the base metal plate. This remarkably increase the service life of the electrical contact.

DESCRIPTION OF THE PREFERRED EMBODIMENTS

Preferred embodiments of an electrical contact manufacturing method and an apparatus for practicing the method will be described with reference to the accompanying drawings.

Figure 1:
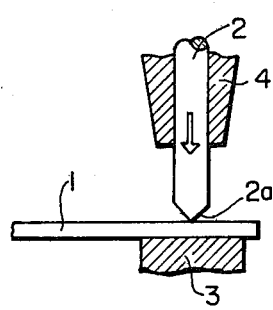
FIG. 1 is a diagram showing a pressurizing step in an electrical contact manufacturing method according to the invention.

In FIG. 1, reference numeral 1 designates a base metal plate of a switch which is made of copper or brass. A contact material in the form of a wire 2, which may be made, for example, of silver, extends to a preselected position on the base metal plate 1 from above. Preferably, the silver wire 2 has a V-shaped end 2a so that its area in contact with the surface of the metal plate 1 is as small as possible. A depression force is applied to the silver wire 2 in the direction of the arrow so that the end 2a is forced into close contact with the surface of the base metal plate 1 under pressure.

Figure 2:
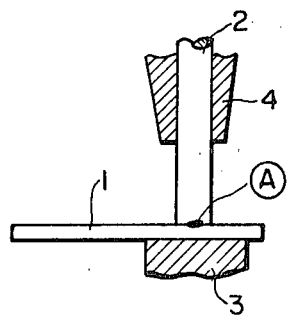
FIG. 2 is a diagram showing a welding step in the method of the invention.

The base metal plate 1 is held by a first electrode 3 while the silver wire 2 is held by a second electrode 4. The electrodes 3 and 4 are the two electrodes of a resistance welder which are connected through a resistance welding transformer to an AC source in a known manner. As current flows between the end of the silver wire and the base metal plate through the electrodes, the silver wire and the base metal are welded together at the point A in FIG. 2.

Figure 3:
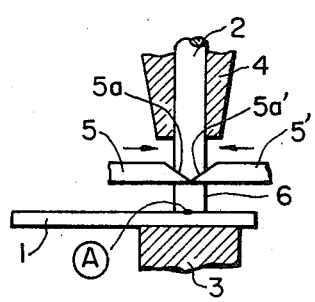
FIG. 3 is a diagram showing a cutting step in the method of the invention.
Figure 4:
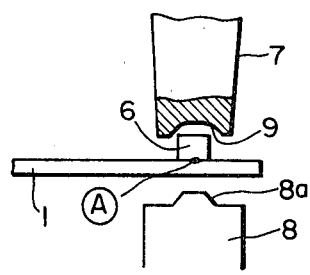
FIGS. 4 and 5 are diagrams showing a contact shaping and raising step in the method of the invention.

After the welding operation, cutter blades 5 and 5' disposed between the base metal plate 1 and the electrode 4 are driven in the directions of the arrows in FIG. 3 to cut the silver wire 2 to a predetermined length thereby to roughly form a contact 6. Cutter blades 5 and 5′ used to cut the wire have sloped upper surfaces 5a and 5a′ so that the cut silver wire 2 has a V-shaped end 2a as desired for forming the next contact. An upper punch 7 is then moved into position above the contact 6 while a lower punch 8 is positioned below the base metal plate 1 in such a manner that the punches 7 and 8 and the contact 6 are in alignment.

Figure 5:
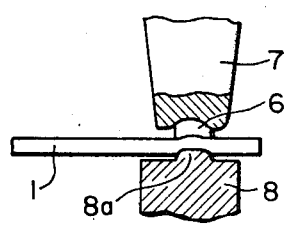

The punches 7 and 8 are shaped as follows. The upper punch 7 has a recess 9 at the end portion which corresponds to the desired final shape and size of the contact 6. The recess 9 preferably has a volume which can absorb the rise of the contact which is caused when a portion of the base metal plate 1 together with the contact 6 rises by operation of the lower punch 8. When the upper punch 7 positioned above the contact 6 is depressed downwardly under air pressure or hydraulic pressure, the contact 6 is deformed into a predetermined shape as shown in FIG. 5.

On the other hand, the lower punch 8 has a circular truncated-cone shape protrusion 8a at the end thereof. The size of the protrusion 8a is substantially the same as that of the contact 6. Upon application of pressure with the protrusion 8a of the lower punch 8 placed on the lower surface of the base metal plate 1 directly below the contact 6, the protrusion 8a strongly depresses the adjacent portion of the base metal plate 1 to cause the adjacent portion and the contact 6 to rise.

In order to produce electrical contacts having an excellent finish and to improve the work efficiency, it is preferable that the upper and lower punches 7 and 8 be operated simultaneously. However, the raising of the contact 6 may be carried out by operating the lower punch 8 after the contact 6 has been shaped to the predetermined size and dimensions with the upper punch 7.

Figure 6:
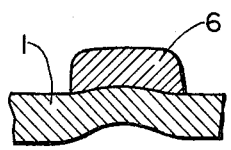
FIGS. 6 and 7 are side sectional views showing examples of a contact which has been shaped and raised according to the invention.
Figure 7:
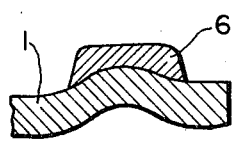
Figure 8:
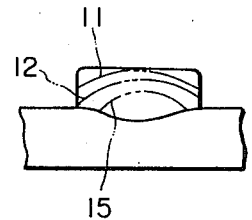
FIG. 8 is an explanatory diagram showing steps of wearing of a conventional contact.

As described, contact 6 is depressed with the upper punch 7 to correct the shape and size thereof while the lower surface of the base metal plate 1 is depressed by the protrusion 8a of the lower punch 8 placed directly below the contact. Accordingly, the junction surface between the contact 6 and the base metal plate 1 can be made relatively flat as shown in FIG. 6 or convex as shown in FIG. 7 as desired.

Due to the fact that, according to the invention, simultaneously with or after the shaping of the spot-like contact welded to the base metal plate with the upper punch, the base metal plate is depressed with the protrusion of the lower punch placed directly below the contact to cause the portion of the base metal plate and the contact to rise thereby to raise the junction surface between the metal plate and the contact, even if the contact is worn to near the junction surface, it is still usable. Thus, the service life of a contact formed according to the invention is much longer than that of a conventional contact.

In the above-described embodiment, the contact material is described as being welded to the base metal plate by resistance welding. However, it should be noted that the invention is not limited thereto or thereby. For instance, the welding operation may be implemented with brazing.

What is claimed is:

1. A method for manufacturing an electrical contact comprising the steps of:

lowering an electrical contact material in a form of a wire having a V-shaped end into contact with a base metal plate;

applying a depression force to said wire in the direction of said base metal plate;

passing a current through said wire and said base metal plate to weld a portion of said contact material on said base metal plate at a predetermined position;

cutting said wire at a point above said contact material portion weld after said current is passed therethrough to leave said contact material portion welded to said predetermined position on said base metal plate so as to leave said portion of said contact material on said base metal plate, said wire being cut so as to leave a substantially planar surface on a top of said contact material portion and a V-shaped surface on an adjacent portion of the wire;

depressing said portion of said contact material from above with an upper punch to mold an electrical contact; and depressing a portion of said base metal plate with a lower punch directly below said portion of said contact material to raise said portion of said contact material.

2. The method of claim 1 in which said contact molding step and said contact raising step are carried out simultaneously.

3. The method of claim 1 in which said contact molding step and said contact raising step are performed in sequence.

4. The method of claim 1, 2 or 3 wherein a junction surface between said portion of said contact material and said base metal plate is flat.

5. The method of claim 1, 2 or 3 wherein a junction surface between said portion of said contact material and said base metal plate is convex.

6. An apparatus for manufacturing an electrical contact comprising:

upper and lower electrodes for welding a contact material on a base metal plate, said upper electrode having means for grasping a wire having a V-shaped end made of said contact material, means for lowering said wire into position on a predetermined position on said base metal plate, and means for applying a depression force to said wire in the direction of said base metal plate;

cutter blades mounted for movement between said base metal plate positioned on said lower electrode and said upper electrode for cutting said wire after said electrodes weld said contact material on said base metal plate to form a rough contact, said cutter blades cutting said wire so as to leave a substantially planar upper surface on said contact material and a V-shaped lower end on the remainder of said wire;

an upper punch having a recess at one end thereof, said recess being adapted to mold said rough contact; and a lower punch adapted to press a portion of said base metal plate directly below said rough contact welded to said base metal plate to raise said contact.

7. The apparatus of claim 6 wherein said lower punch has a circular truncated-cone shaped protrusion at the end thereof, a size of said protrusion being substantially the same as that of said contact.

* * * * *